UNITED STATES PATENT OFFICE.

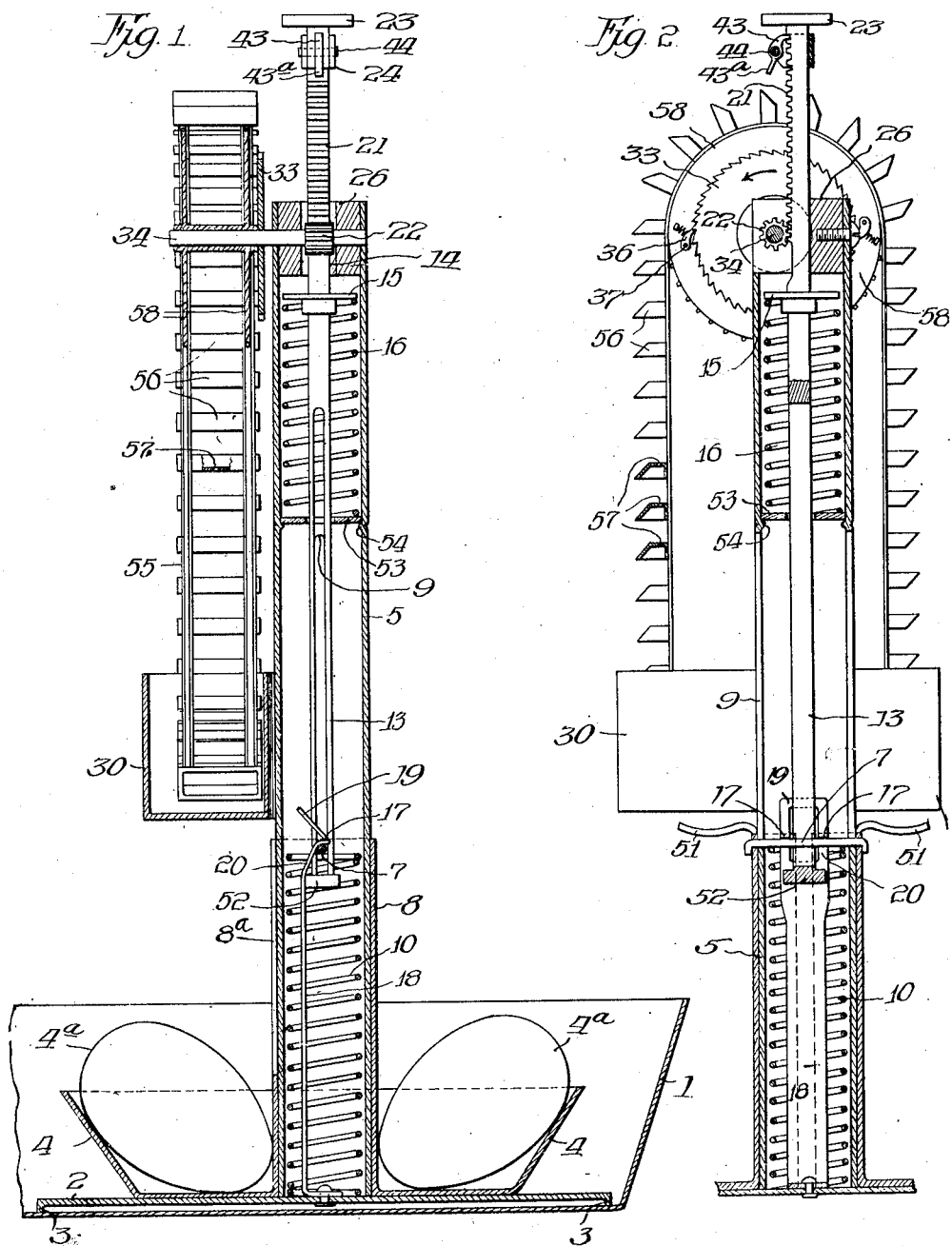

WILL ESPY CURTIS, OF EVANSTON, ILLINOIS.

DEVICE FOR REGULATING TREATMENT OF SUBSTANCES CHRONOMETRICALLY.

1,355,817. Specification of Letters Patent. Patented Oct. 19, 1920.

Original application filed February 23, 1917, Serial No. 150,470. Divided and this application filed June 27, 1918. Serial No. 242,162.

*To all whom it may concern:*

Be it known that I, WILL ESPY CURTIS, a citizen of the United States, and a resident of Evanston, in the county of Cook and State of Illinois, have invented certain new and useful Improvements in Devices for Regulating Treatment of Substances Chronometrically, of which the following is a specification.

My invention relates to a device for automatically regulating the length of time during which an object or substance is subjected to treatment—such, for example, as exposure to heat, chemical solutions or vapors, etc.—its object being to provide an apparatus and mechanism by which, for example, an object or substance being immersed, for instance, in a heated liquid is at an appointed time withdrawn from the same without further attention on the part of the operator.

It consists also in an extension of the constructive principle involved to an apparatus adapted to receive and care for in like manner any number of objects or substances with certainty of action and entire independence each of the other.

The applications of the invention in the arts are quite numerous and important—for example, the immersion of textile and other fabrics in dyeing solutions, subjection of products to chemical action of vapors or liquid solutions, treatment of food products, such as eggs, fruit, and starchy substances, by boiling water, printing of photographs from negatives, and various other cases where the time of immersion or treatment or the beginning or termination of a given condition is important to be observed.

In the present illustrations of my invention I have selected its application to culinary purposes, and exhibit in the drawings an apparatus designed more particularly for use in connection with the boiling of eggs, for the use of hotels, hospitals, private dwellings, etc.

The principal objects of my present invention are to provide improved means for regulating chronometrically the treatment of substances; to provide an improved chronometric regulating device; to provide improved means for controlling the continuous movement of an element; the provision of improved means for lowering and raising material from a treating bath, and the provision of improved means for allowing a member to move freely in one direction, and at a predetermined limited rate of speed in the opposite direction.

In attaining these and other objects and advantages to be hereinafter set forth, I have provided a construction an embodiment of which is illustrated in the accompanying drawings, in which:

Figure 1 is a side view of a form of egg boiler constructed in accordance with my present invention; and Fig. 2 is a front view of the egg boiler shown in Fig. 1.

In the drawings of the parent case (application Serial No. 150,470, filed February 23, 1917) of which this is a division, two forms of construction are shown, in the first case, one in which the egg container is depressed and the timing mechanism is set by a single operation, and in the present case, a somewhat simpler form in which the egg container is depressed by a separate operation from that which sets the timing mechanism. The latter construction will now be described.

The apparatus illustrated in the drawing is arranged to stand in a saucepan or the like 1 and for this purpose is provided with a spider 2, the three arms of which are provided with feet 3 arranged to rest on the bottom of the saucepan. As shown in the drawings, the apparatus is shown in the position the parts assume, after the container 4 for the eggs $4^a$ has been depressed and the timing mechanism operated to a point where the egg container is again about to rise and lift the eggs from the water. The eggs are carried in an annular container 4 arranged to slide up and down on a tube 5. A pin 7 is attached to the cylindrical part 8 of the container 4. This pin passes through a slot 9 in the tube 5 which allows the container 4 to be moved downwardly into the water in the saucepan, and upwardly again at the desired time. The egg container 4 is slotted as indicated at $8^a$ to allow it to pass the fluid container 30 below referred to. Within the tube 5 is arranged a helical spring 10 preferably of brass, or other material which will not rust or corrode by contact with water. The spring 10 will normally tend to hold the container 4 in its uppermost position, but upon downward movement thereof in setting the device the egg container is depressed and held in the saucepan 1, as shown in Fig. 1.

Inside of the tube 5 is arranged a plunger 13, preferably of rectangular cross-section, arranged to pass through a complementarily shaped aperture 14 in the upper part of the tube 5. This plunger is provided with a projecting portion 15 adapted to contact with and compress the spring 16 arranged within the tube 5 when the plunger is depressed. By pressing the member 13 downward as far as permitted by the washer 53, held in place by an inwardly projecting shoulder 54 on the tube 5, with consequent compression of the spring 16 the tube 5 may be caused to descend, thereby depressing the egg container 4. As a result of the depression of the egg container 4 the pin 7 is brought under the hooked portions 17 of a bifurcated spring latch 18 (as shown in Fig. 2) so that the container 4 will be held in its depressed position until the latch 18 is released from engagement with the pin 7. The bifurcated ends 17 of the latch 18 are spaced apart sufficiently to allow the body of the plunger 13 to pass therebetween. When the latch 18 has been moved out of engagement with the pin 7 the egg container is moved upwardly by means of the spring 10. This latch is released by the plunger 13 at a given interval after the egg container has been depressed. For this purpose the plunger 13 is provided with an enlarged end 52 having laterally extending portions (see Fig. 2) adapted to engage the shoulders 20 on the two bifurcated end portions 17 of the latch 18 and push them to one side and thereby move the parts 17 out of, engagement with the pin 7, whereupon the spring 10 is free to move the egg container upwardly. The end portions 17 of the latch 18 are provided with inclined portions 19 (see Fig. 1) in order that the plunger 13 may push the ends 17 of the latch 18 aside on its downward movement, after which the parts 17 spring back into position to engage the pin 7. The action of the device depends upon the fact that the time required for the plunger to move upwardly under the action of the spring 16 is chronometrically controlled so that the release of the pin 7 from the catch 17 by means of the plunger will take place at a predetermined interval after the plunger has been depressed.

For controlling the rate of upward movement of the plunger it is provided with teeth 21 for a part of its length. These teeth 21 are adapted to engage with a pinion 22. This pinion 22 is connected to a speed governor device, to be hereafter described, which will allow the pinion 22 to rotate clockwise (as viewed in Fig. 2) without substantial restriction. The governor, however, prevents rotation of the pinion 22 in contraclockwise direction at more than a predetermined rate of speed. When the plunger 13 is depressed manually by pressure on its knob 23 to its lowest extent, the teeth 21 will rotate the pinion 22 rapidly in a clockwise direction, and similarly the egg container 4 is depressed manually by pressure on the finger-holds 51 in order to bring the pin 7 beneath the portions 17 of the latch 18. After the hand has been taken off the knob 23, the plunger will move very slowly upwardly under the action of the spring 16 and thereby rotate the pinion 22 in contraclockwise direction. Until the toothed portion of the plunger has passed the pinion 22 (when the plunger will move rapidly upward under the action of its spring 16, thereby tripping the latch 18 and allowing the egg container to move upwardly) the speed of rotation of the pinion 22 is controlled, and the time for one revolution, or a given part of a revolution thereof, is, therefore, substantially fixed. In order, therefore, to vary the time of tripping the number of teeth of the rack 21 brought into engagement with the pinion 22 is varied. For this purpose an adjustable member 24 is arranged at the upper end of the plunger 13, the position of which may be varied by means of the thumb latch 43. The bottom portion of this member 24 engages the plug 26 mounted within the tube 5, and consequently limits the distance the plunger 13 can be depressed in tube 5. This plunger is graduated in fractions of minutes so that the device may be set so that the plunger trips the latch 18 at any desired length of time after it has been depressed. The thumb latch 43 is pivotally mounted at 44 on the member 24, and so weighted as to be held in engagement with one or other of the teeth 21, except when withdrawn by pressure upon the finger-piece 43ª.

The governor device shown includes a wheel 58 carrying a series of buckets 56 which may be mounted on an endless chain 55, and are arranged to take up material from a container 30. The chain is arranged to pass around the sprocket wheel 58 which may be rotatably mounted on the same shaft 34 which carries the pinion 22 now rotatably mounted thereon, which pinion meshes with the rack 21 on the plunger 13. For driving the wheel 58 at the same rate of revolution as the pinion 22, in one direction, a toothed wheel 33 non-rotatably mounted on the shaft 34 may be employed. Operative connection between the pinion 22 and the wheel 58 is made by means of the pawl and ratchet construction shown. The spring pressed pawl 36 is pivotally mounted at 37 on the wheel 58 and adapted to engage ratchet teeth on the wheel 33. With this arrangement the pinion 22 is free to rotate in a clockwise direction without rotating the wheel 58, but when rotated in the opposite direction turns the wheel 58. Provision has been made for a pawl and ratchet connection between the pinion 22 and the wheel 58 instead of providing ratchet teeth on the pinion 22 and the plunger 13 as it greatly decreases the wear and tear on the parts. If the plunger 13 and pinion 22 were provided with ratchet teeth, a heavy spring might be required to hold the parts in contact, and on the downward movement of the plunger there would be excessive wear as the teeth thereon slipped over the teeth of the pinion while being pressed together by means of the spring.

The buckets 56 are provided with small apertures 57 in their lower portions so as to allow of the slow escape of liquid or finely divided solid from the buckets. Provision for accurate chronometric regulation depends on the careful proportioning of the buckets 56 and orifices 57.

The buckets 56, and the lower portion of the chain 55 where such is used, pass through a container 30 which is partially filled with a liquid, or a finely divided solid, so as to cause the buckets to dip beneath the surface of the material. The purpose of this liquid or finely divided solid is to check the rotation of the wheel. I prefer to fill the container 30 about as full as convenient so as to afford ample supply of material for the buckets 56. The rotation of the wheel 33 in the direction of the arrow and thence of the chain 55 of buckets 56 is retarded by the material in the buckets owing to the fact that the material cannot flow sufficiently rapidly through the orifices 57 in the buckets 56 to keep the elevation of the material in the buckets 56 from changing relatively to the container 30. Consequently, the elevation of the material on the right-hand side of the chain becomes higher until the head of material carried by the right-hand side of the chain 55 is sufficient to retard the movement of the chain and thereby of the wheels 58 and 33 and the plunger 13, but as the material flows through the orifices 57, but in the opposite direction to the rotation of the wheel, the movement of the chain 55 continues until the teeth of the pinion 22 become disengaged from those of the rack 21. Evidently the force required to rotate the wheel will increase with the height to which the mercury is drawn up on one side of the wheel by the rotation of the wheel. There will be a position of equilibrium between the driving force and the resistance to movement offered by the mercury corresponding to a certain speed.

In the operation of the device it is to be noted that the plunger 13 never rises above the parts 17 of the latch 18. The plunger rises only far enough to trip the latch by means of the enlarged end 52 on the end of the plunger which engages the portions 20 of the latch. The spring 10 then raises the egg container 4 from the water as soon as the plunger has moved the latch 18 out of engagement with the pin 7. In the resetting of the egg container the governing device has to be reset by pressure upon the knob 23 depressing the plunger 13 and after adjusting the plunger to the desired position the egg container has to be depressed by a separate operation, namely, pressure of the fingers on the finger-holds 51.

The principle involved in the foregoing form of governor may be applied to speed regulation in a number of ways as in one aspect it consists broadly in causing fluid to be moved at a velocity proportional to the velocity of a moving element and interposing a restriction in the path of the fluid so that the resistance to movement of the fluid increases with the velocity of the element and at a given predetermined speed equals the force applied to that element to give it movement. In another aspect this principle consists broadly in providing a weight movable relatively to a member rotated from a source of power and having its center of gravity at a distance from the axis of rotation of the member, and having frictional engagement with the latter so that the higher the speed the member is rotated the greater the displacement of the center of gravity of the weight with the result that a position of equilibrium is obtained at a predetermined speed.

Having thus described my invention and illustrated its use what I claim as new and desire to secure by Letters Patent is:

1. A chronometric regulating device comprising, in combination, a source of power, a flexible member moved thereby, a series of buckets arranged on said flexible member having orifices in their lower portion, and a supply of fluid, said flexible member being arranged to pass into and out of said fluid whereby the movement of said member is checked with a force increasing with its rate of movement and thereby a substantially constant rate of movement is obtained.

2. A chronometric regulating device comprising, in combination, a source of power, a member moved thereby, a series of buckets arranged on said member having orifices in their lower portion, a supply of fluid, said member being arranged to pass into and out of said fluid whereby the movement of said member is checked with a force increasing with its rate of movement and thereby a substantially constant rate of movement is obtained.

3. A chronometric regulating device comprising, in combination, a source of power, a member moved thereby, a series of buckets arranged on said member having escape orifices, a supply of fluid, said member being arranged to pass into and out of said fluid whereby the movement of said member is checked with a force increasing with its rate of movement and thereby a substantially constant rate of movement is obtained.

4. A chronometric regulating device comprising, in combination, a source of power, a member moved thereby, a series of buckets arranged on said member having escape orifices, a supply of fluid, said member being arranged to pass said buckets into and out of said fluid supply and take up fluid whereby the movement of said member is checked with a force increasing with its rate of movement and thereby a substantially constant rate of movement is obtained.

5. A chronometric regulating device, comprising in combination, with a source of power, and a source of fluid, a member moved by power from said source, and a series of retarding elements arranged on said member, said member being arranged to pass said elements into and out of said fluid whereby the movement of said member is checked with a force increasing with its rate of movement and thereby a substantially constant rate of movement is obtained.

6. A chronometric regulating device comprising, in combination, with a source of fluid and a source of power, a member moved by power from said source and a series of buckets arranged on said member having escape orifices, said member being arranged for the supplying of fluid from said source to said buckets whereby the movement of said member is checked with a force increasing with its rate of movement and thereby a substantially constant rate of movement is obtained.

7. A chronometric regulating device comprising, in combination, with a source of fluid and a source of power, a member moved by power from said source and a series of fluid containing retarding elements arranged on said member and having escape orifices, the several parts being constructed and arranged for the supply of fluid from said source to said retarding elements whereby the movement of said member by the source of power is checked with a force increasing with its rate of movement and thereby a substantially constant rate of movement is obtained.

8. A chronometric regulating device comprising, in combination, with a source of fluid and a source of power, a member moved by power from said source, a series of fluid containing retarding elements arranged on said member and having escape orifices, and a slip connection between said member and said source of power whereby movement of one without movement of the other may be made in one direction, the said several parts being arranged for the supply of fluid from said source to said retarding elements whereby movement of said member by the source of power is checked with a force increasing with its rate of movement and thereby a substantially constant rate of movement is obtained.

9. A chronometric regulating device, comprising, in combination, with a source of fluid and a source of power, a member moved by power from said source, a series of fluid containing retarding elements arranged on said member and having escape orifices, and a ratchet connection between said member and said source of power whereby movement of one without movement of the other may be made in one direction, the said several parts being arranged for the supply of fluid from said source to said retarding elements whereby movement of said member by the source of power is checked with a force increasing with its rate of movement and thereby a substantially constant rate of movement is obtained.

10. A chronometric regulating device comprising, in combination with a source of fluid and a source of power, a member moved by power from said source, a series of fluid containing retarding elements arranged on said member and having escape orifices, and a gearing between said member and said source of power whereby movement of one without movement of the other may be made in one direction, the said several parts being arranged for the supply of fluid from said source to said retarding elements whereby movement of said member by the source of power is checked with a force increasing with its rate of movement and thereby a substantially constant rate of movement is obtained.

11. In an apparatus for regulating chronometrically the treatment of substances, a member adapted to hold the material to be treated, releasable means for moving said holding member, and means for releasing said moving means for the holding member, including a source of fluid, a source of power, a member moved by power from said source and a series of fluid containing retarding elements arranged on said member and having escape orifices, the said several parts being arranged for the supply of fluid from said source to said retarding elements whereby movement of said last mentioned member by the source of power is checked with a force increasing with its rate of movement and thereby a substantially constant rate of movement is obtained.

12. In an apparatus for regulating chronometrically the treatment of substances, a member adapted to hold the material to be treated, releasable means for moving said holding member, and means for releasing said moving means for the holding member, including a source of fluid, a source of power, a member moved by power from said source and a series of fluid containing retarding elements arranged on said member and having escape orifices, and a variable connection between said member and said source of power whereby movement of one without movement of the other may be made in one direction, the said several parts being arranged for the supply of fluid from said source to said retarding elements whereby movement of said last mentioned member by the source of power is checked with a force increasing with its rate of movement and thereby a substantially constant rate of movement is obtained.

13. A chronometric regulating device comprising, in combination with a source of fluid and a source of power, a member moved by power from said source, and a series of retarding elements operable by fluid from said source and arranged on said member, the series of retarding elements being constructed and arranged to permit the discharge of fluid from action on one of said elements into action on another of said elements, whereby the movement of said member by the source of power is checked with a force increasing with its rate of movement and thereby a substantially constant rate of movement is obtained.

14. A chronometric regulating device comprising, in combination with a source of fluid and a source of power, a member moved by power from said source, and a series of retarding buckets operable by fluid from said source and arranged on said member, the series of retarding buckets being constructed and arranged to permit the discharge of fluid from action on one of said buckets into action on another of said buckets, whereby the movement of said member by the source of power is checked with a force increasing with its rate of movement and thereby a substantially constant rate of movement is obtained.

15. A chronometric regulating device comprising, in combination with a source of fluid and a source of power, a member moved by power from said source, and a series of retarding buckets and operable by fluid from said source and arranged on said member, the series of retarding buckets being constructed and arranged for intercommunication to permit the discharge of fluid from action on one of said buckets into action on another of said buckets, whereby the movement of said member by the source of power is checked with a force increasing with its rate of movement and thereby a substantially constant rate of movement is obtained.

16. A chronometric regulating device comprising, in combination with a source of fluid and a source of power, a member moved by power from said source and a series of retarding buckets operable by fluid from said source and arranged on said member, the series of retarding buckets being apertured to permit the discharge of fluid from action on one of said buckets into action on another of said buckets, whereby the movement of said member by the source of power is checked with a force increasing with its rate of movement and thereby a substantially constant rate of movement is obtained.

In testimony whereof, I have hereunto signed my name.

WILL ESPY CURTIS.